Dec. 16, 1969　　　　E. S. ULM　　　3,483,596
TIRE POST CURE INFLATOR

Filed June 12, 1967　　　　　　　　　　　　8 Sheets-Sheet 1

Fig. 1

INVENTOR
ERNEST S. ULM

BY
Oberlin, Maky, Donnelly & Renner
ATTORNEYS

Dec. 16, 1969     E. S. ULM     3,483,596
TIRE POST CURE INFLATOR Filed June 12, 1967     8 Sheets-Sheet 4

INVENTOR
*ERNEST S. ULM*

BY
*Oberlin, Maky, Donnelly & Renner*
ATTORNEYS

Dec. 16, 1969   E. S. ULM   3,483,596
TIRE POST CURE INFLATOR
Filed June 12, 1967   8 Sheets-Sheet 5

INVENTOR
ERNEST S. ULM

BY
Oberlin, Maky, Donnelly & Renner
ATTORNEYS

Dec. 16, 1969                        E. S. ULM                        3,483,596
TIRE POST CURE INFLATOR
Filed June 12, 1967                                          8 Sheets-Sheet 8

INVENTOR
ERNEST S. ULM

BY
Oberlin, Maky, Donnelly & Renner
ATTORNEYS

United States Patent Office 3,483,596
Patented Dec. 16, 1969

3,483,596
TIRE POST CURE INFLATOR
Ernest S. Ulm, Stow, Ohio, assignor, by mesne assignments, to AMK Subsidiary Corp., Akron, Ohio, a corporation of Ohio
Filed June 12, 1967, Ser. No. 645,283
Int. Cl. B29h 5/02
U.S. Cl. 18—2
15 Claims

ABSTRACT OF THE DISCLOSURE

A four tire post cure inflator for a two tire press adapted to receive and inflate each tire but every other tire on a separate pair of axially rotating chuck elements, index such tires into a vertical plane for ambient cooling as they are rotating, with yokes for the outer elements being guided for opening and closing partly on fixed and partly on movable guides, and improved chuck lock mechanisms and rotary seals with the former firmly securing the chuck elements together in any relative rotative position thereof.

---

This invention relates generally as indicated to a post cure inflator and more particularly to a four tire post cure inflator for a two tire press obtaining optimum uniform cooling and release temperature for such tires.

In Brundage U.S. Patent No. 3,170,187, there is disclosed a four tire post cure inflator utilizing parallel frames supporting tire chuck elements with relative movement of the frames opening and closing the inflator for chucking the tires for inflation and ambient cooling following vulcanization. The cooling period is substantially twice the vulcanizing cycle of the press. In the illustrated embodiment of such patent, the frames are reciprocated along an inclined linear path, but the patent teaches that the invention may be practiced by rotating or conveying the units about a central axis to position each set of rim inflating assemblies in the proper loading and unloading position. Subsequent developments as seen in Soderquist Patent No. 3,075,237 or Ericson et al. Patent No. 3,214,791 provide for flip-over for loading and unloading of the tire chuck elements or inflating rim assemblies.

However, it has been found that with one tire positioned substantially above the other particularly along a slightly inclined path that uniform cooling of the tire, particularly at ambient conditions, does not obtain. At the end of the curing cycle, the release temperature within the tire may actually vary substantially so that optimum uniformity in post cure inflation cooling is not provided. This may affect the quality of the tire produced.

Within the present invention, there is provided a four tire automatic post cure inflator which positions the tire in a vertical plane to obtain maximum natural air flow during cooling and also rotates the tire about its axis to obtain a uniform release temperature around the tire. This also facilitates the use of forced air cooling since the tire is axially rotated within the air flow path and obtains equal surface exposure to the cooling air thus resulting in a uniform temperature around the tire.

It is accordingly a principal object of the present invention to provide an automatic multiple tire post cure inflator which will obtain a uniform temperature around the tire following the post cure inflation cycle.

Another principal object is the provision in a post cure inflator of a chuck locking mechanism which will obtain automatic secure locking of the chuck elements at any relative rotative position thereof.

Another object is the provision of a post cure inflator of the flip-over type having a simplified structural frame wherein the yokes supporting the outer chuck elements are guided for opening and closing movement partly on fixed and partly on movable guides.

A further object is the provision of such post cure inflator having a yoke configuration supporting the outer chuck elements which reduces the space requirements for the unit.

A yet further object is the provision of such a post cure inflator having a single actuating cylinder for opening and closing movements for both tires in the unit.

Still another object is the provision of a unique ball type lock for the chuck elements incorporating safety features preventing release of the tires while under pressure.

A still further object is the provision of a unique rotary air seal for such post cure inflator wherein the rotary tire chucks may be provided with air for tire squeeze pressure and for actuation of the ball lock for the chuck elements.

Yet another object is the provision of a tire stop mechanism wherein the tire stops and guides as well as supporting conveyor sections may be adjusted simultaneously through a proportioning mechanism to convert the machine to tires of different size in a very short time.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIGS. 6 through 9 are enlarged vertical sections taken through one pair of chuck elements illustrating the operation of the chuck locking mechanism with FIG. 6 showing in section the rotary seal providing fluid connections to the chuck operating mechanisms.

General arrangement

Figure 10:
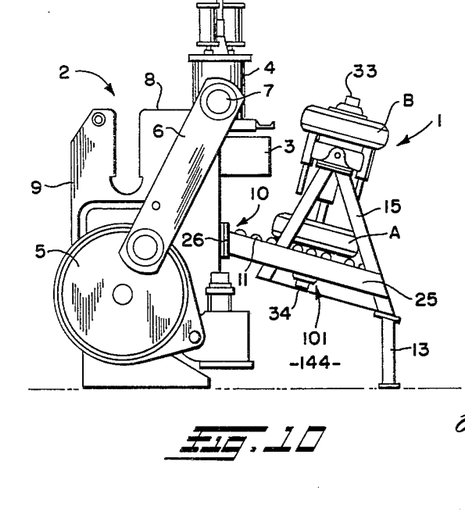
FIGS. 10 through 14 are fragmentary side elevations of the post cure inflator and the associated tire press illustrating the cycle of operation thereof.

Referring first to FIG. 10, it will be seen that the post cure inflator 1 is adapted to be mounted at the discharge or back end of a dual cavity tires press 2. Although the associated tire press for the post cure inflator may be of any type, that illustrated is perhaps best seen in detail in Brundage et al. U.S. Patent No. 3,065,499, entitled Tire Handling and Curing Press assigned to NRM Corporation of Akron, Ohio. The press basically comprises upper and lower mold sections with the upper section 3 being supported on press head 4 which is moved upwardly and back by means of bull gears 5 at opposite ends of the press which are connected to the head 4 through links 6. The pin connection 7 between the links and the head 4 rides on the top surface 8 of cam plates 9 for the opening and closing movement of the press. In the discharge and loading position of the press, seen in FIG. 10, a green tire will be positioned on the bottom mold section by suitable loading mechanism while the hot tire is discharged from the upper mold section onto inclined discharge conveyor 10. The discharge conveyor 10 comprises a series of idler rollers 11 which without the post cure inflator 1 would simply discharge the tires from the press onto a conveyor extending normal to the plane of FIG. 10. There would normally be two discharge conveyors, one for each cavity of the usual dual cavity press which cures two tires simultaneously.

The post cure inflator 1 is supported at the outer end by a pair of legs 13 and at the inner end is secured to the back of the press 2. Each leg 13 is directly beneath A-frame struts 14 and 15 (see FIGS. 1 through 4) which join at the top with struts 16 and 17. Mounting plates 18 and 19 are secured to the tops of the struts 14, 16 and 15, 17, respectively, and self-aligning ball bearing pillow blocks 20 and 21 are supported thereon, each being held in place by suitable fasteners 22. The struts on each side of the machine are connected together near their lower ends by frame members 24 and 25, the inner ends of which may be secured by suitable fasteners to the back edges of the side plates 9 of the press 2 as shown at 26. The side frames connecting together the A-frame struts are inclined as the discharge conveyor for gravity feeding and discharge of the tire both from the press and from the post cure inflator unit 1.

The lower ends of the struts 16 and 17 are interconnected by frame member 27 while the lower end of the struts 14 and 15 are interconnected by a similar frame member 28. The two longitudinal frame elements 27 and 28 are than interconnected transversely by center plate 29. The struts 15 through 18 and the side frames 24 and 25 as well as the longitudinal frames 27 and 28 are of tubular construction and may be welded together to form a rigid supporting frame work for the post cure inflator.

The tire holding and inflating portion of the machine comprises a center frame or support 32 and two yokes 33 and 34 on each side thereof and movable with respect thereto. The center frame comprises two longitudinally extending square tubular frame members 35 and 36 which are secured to end plates 37 and 38. Additional bridge plates 39 and 40 parallel to and close to the end plates 37 and 38 support the inner ends of trunnion pins 41 and 42 projecting from the opposite ends of the frame 32. The pin 41 projects into the pillow block 20 while the pin 42 projects through the pillow block 21 and is provided on the end thereof with sprocket 43. The sprocket 43 is connected by chain 44 to drive sprocket 45 driven by drive unit 46 powered by reversible drive motor 47. The drive unit 46, 47 is supported on mounting plate 48 projecting from the strut 15 and additionally supported by brace 49.

The center frame members 35 and 36 are additionally joined by horizontally oriented plates 51 and 52 which in turn support hubs 53 and 54 in which are secured the axles 55 and 56 supporting on opposite ends thereof outwardly directed rim inflating assemblies 58, 59, 60 and 61. The hubs may be secured to the respective plates 51 or 52 by suitable fasteners such as indicated at 62 in FIG. 7. The details of the rim inflating assemblies and their mounting on the axles 55 and 56 will be more fully described in connection with the locking chucks seen more clearly in FIGS. 6 through 9.

Figure 4:
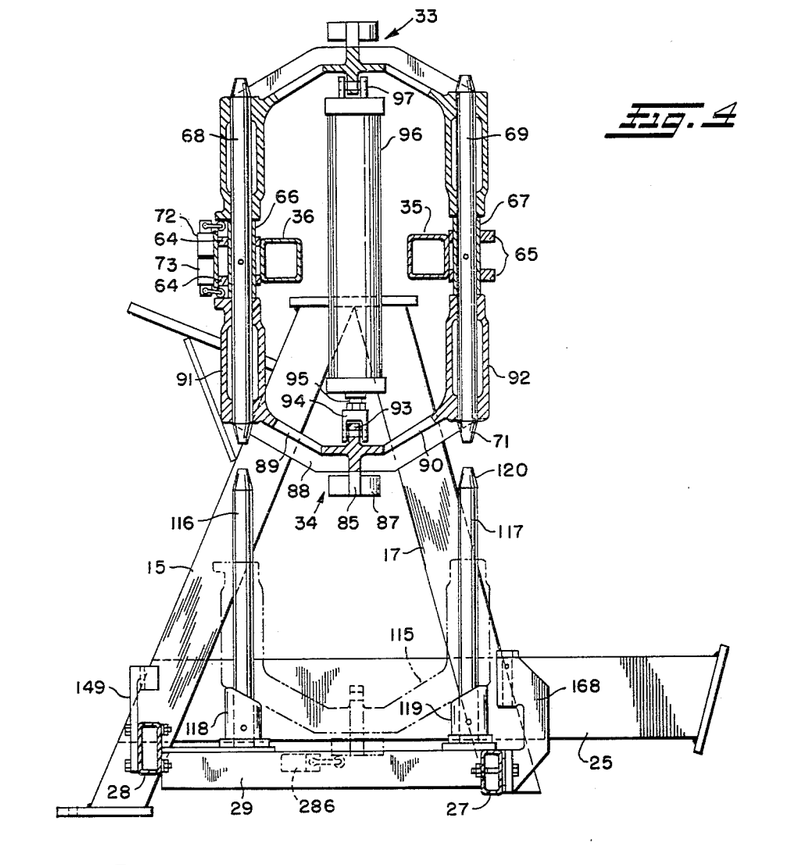
FIG. 4 is a fragmentary vertical section taken substantially on the line 4—4 of FIG. 2 and viewing the unit from the opposite end seen in FIG. 1.

At the center of the longitudinal center frame members 35 and 36 on the outside of each member there is provided a pair of spaced trapezoidal plates indicated at 64 and 65 in FIG. 4, each pair of which encloses a sleeve as shown at 66 and 67, respectively. Guide pins 68 and 69 are secured in such sleeves as by pins 70 and each end of the guide pins is tapered as indicated at 71. The pair of plates 64 support limit switches 72 and 73 while the pair 65 support worm transmission 74 driven by drive motor 75. The worm drives shaft 76 projecting top and bottom from the transmission and provided with belt sheaves 77 and 78. Drive belts 79 and 80 lead from such sheaves to somewhat larger sheaves 81 and 82 which are mounted on the axles 55 and 56, respectively, so that they and the rim inflating assemblies 58 through 61 supported thereby will be rotated. The tire rotation velocity achieved by such drive will preferably be on the order of 12 r.p.m., but a range of from about 1 to about 300 r.p.m. may be suitable. Additional cooling can be attained by even higher rotational speeds which will produce centrifugal as well as turbulent action of the air affected by and in contact with the tire.

The configuration of the yokes 33 and 34 is perhaps best seen in FIG. 4. Since each yoke is identical in form, only the yoke 34 will be described in detail and it will be appreciated that the same reference numerals will be applied to the yoke 33 to corresponding parts. The yoke 34 comprises a longitudinal frame element 85 which is of the shallow V-shape shown and which terminates at each end in hubs 86 and 87. The longitudinal frame member 85 at its center is formed integrally with a transverse frame 88 which again is of a shallow V-shape configuration as seen in FIG. 4, but which opens in the opposite direction or toward the center of the unit. The transverse frame may be of a channel sectional configuration with the back of the channel being cut-away on each side of the center as indicated at 89 and 90. The transverse frame terminates in two parallel guide sleeves 91 and 92 adapted to confine closely the guide pins 68 and 69. Each yoke is provided with a center interior lug 93 with the clevis 94 of the rod 95 of piston-cylinder assembly 96 being connected to the lug on the yoke 34 while clevis 97 at the blind end of such assembly is connected to the lug on yoke 33. The piston-cylinder assembly 96, when extended or retracted, will move the respective yokes 33 or 34 along the guides 68 and 69 when such yokes are free to move.

Figure 5:
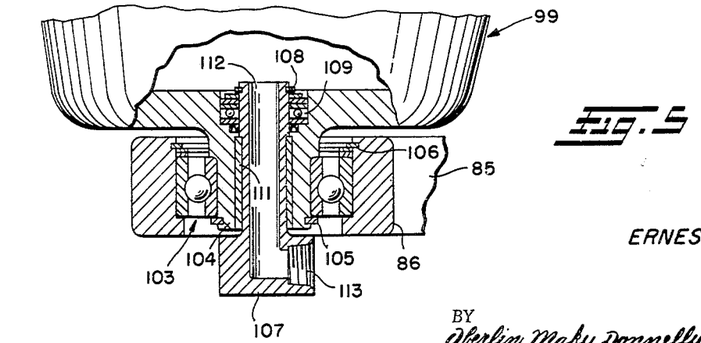
FIG. 5 is an enlarged fragmentary detail partially in section of the journal of the chuck elements at the distal ends of the yoke.

The outer or distal ends of the yokes 33 and 34 rotatably support tire rim inflating assemblies 98, 99, 100 and 101 which are axially aligned with and opposed to the assemblies 58, 59, 60 and 61, respectively, to cooperate therewith for providing four separate chuck elements for releasably holding four tires. The rotatable support of the assemblies 98 through 101 is perhaps more clearly seen in FIG. 5 wherein the hub 86 is provided with a ball bearing 103 between the hub and annular sleeve-like projection 104 extending from the assembly 99. The bearing may be held in place by snap rings seen at 105 and 106 on the projection and hub, respectively. A pintle 107 projects through the circular extension 104 of the assembly 99 and is held in place by snap ring 108 on top of roller thrust bearing 109 in the annular recess in the interior of the assembly 99. An air seal seen at 110 surrounds the pintle within the assembly and beneath the air seal there is provided a sleeve bushing 111. The pintle is provided with an air passage 112 which terminates in inwardly directed tapped port 113 to which piping may be connected extending along the exterior of the longitudinal frame 85 of the yoke 34. In this manner, even though the assembly 99 be rotating, inflation pressure may be supplied through the pintle to inflate the tire.

As seen in FIG. 4, with the upper yoke 33 locked in the position shown through the tire chuck locks between the inflating rim assemblies 98, 58 and 100 and 60, respectively, and with the chuck locks between the assemblies 59 and 99 and 61 and 101, respectively, released, extension of the piston-cylinder assembly 96 will move the lower yoke to the phantom line position indicated at 115. This moves the lower rim assemblies 99 and 101 beneath the plane of the press discharge conveyor so that a tire may be positioned thereover or conversely so that a tire may be discharged onto such conveyor. To guide such yokes in such opening and also in closing movement, there is provided upwardly projecting fixed guides 116 and 117 which are connected to stanchions 118 and 119, respectively, supported above the center transverse frame element 29. The fixed guides 116 and 117 have tapered tops 120 which are fairly closely spaced from the tapered ends 71 of the guides 68 and 69. Sufficient clearance, however, is provided between the ends of the guides to permit the portion of the post cure inflator mounted on the trunnion blocks 20 and 21 to oscillate as will hereinafter be more fully described.

Tire positioning and support mechanism

Figure 1:
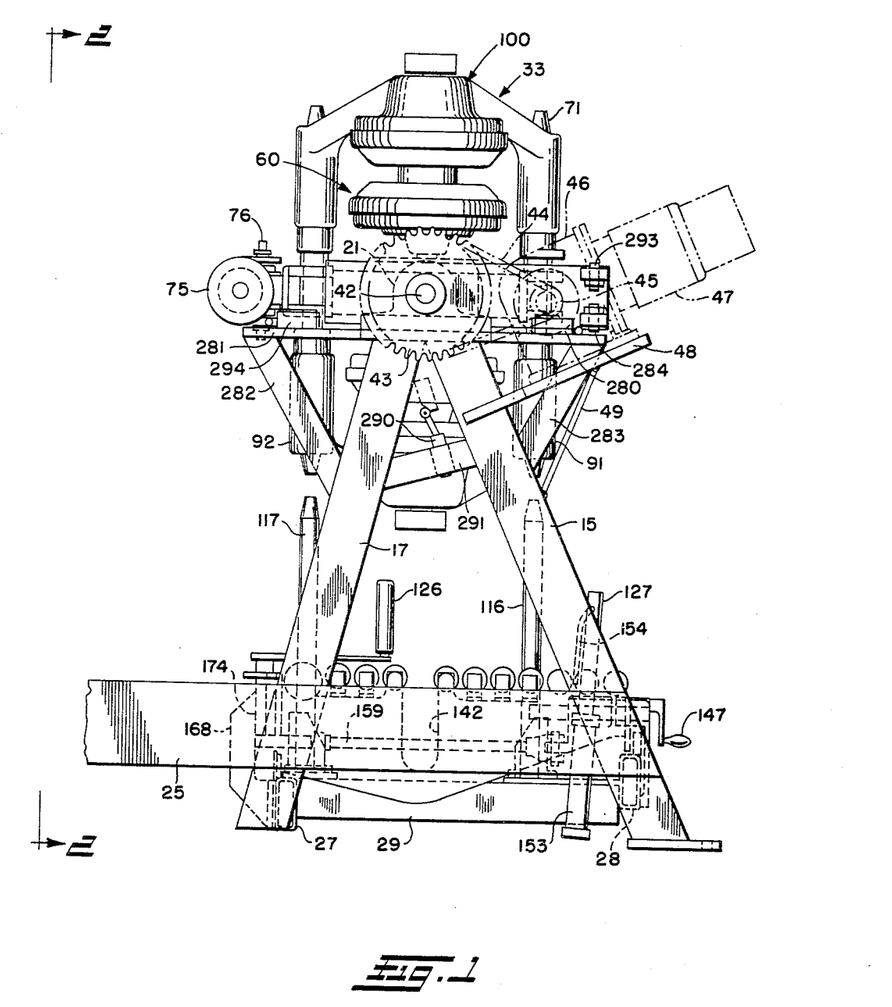
FIG. 1 is an end elevation of a post cure inflator in accordance with the present invention partially broken away.
Figure 2:
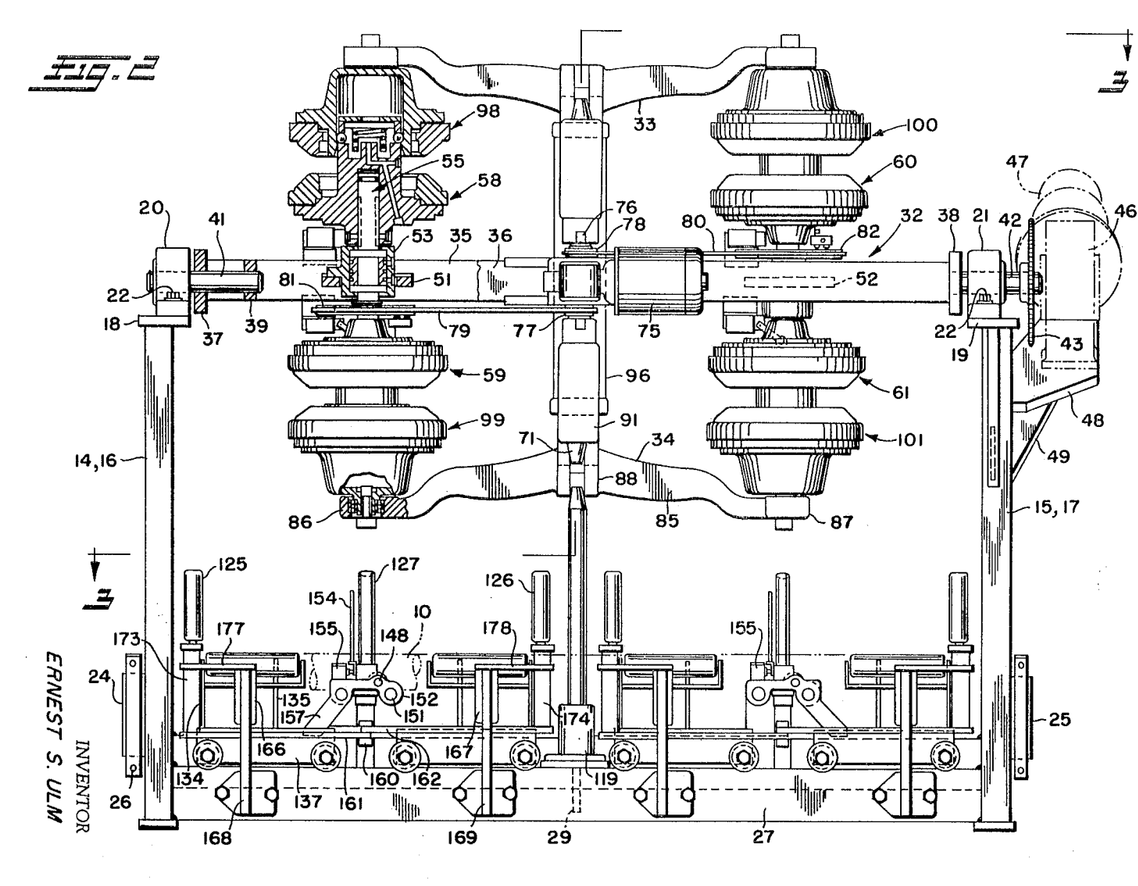
FIG. 2 is a side elevation of such post inflator taken substantially from the line 2—2 of FIG. 1 and partially broken away and in section for clarity of illustration.
Figure 3:
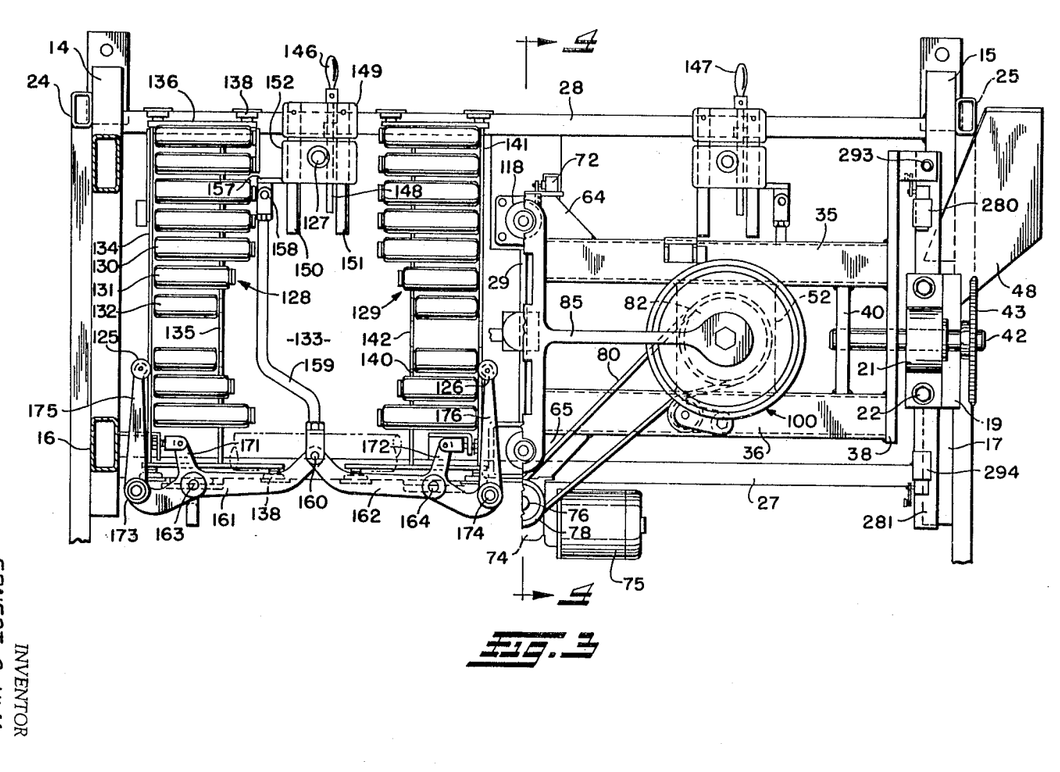
FIG. 3 is a top plan view of such post cure inflator with the upper part of the machine partially broken away near the center taken substantially on the line 3—3 of FIG. 2.

Referring now more particularly to FIGS. 1, 2 and 3, each side of the machine is provided with a conveyor section as well as lateral tire guides 125 and 126 and a retractible tire stop 127. Since the conveyor sections and tire guides and stops are identical on each side of the machine, only the unit at the left of the machine as viewed in FIGS. 2 and 3 will be described in detail.

Referring particularly to FIG. 3, the tire will move down the discharge conveyor of the press onto the conveyor section moving from the bottom of FIG. 3 to the top onto conveyor sections 128 and 129, each of which may be substantially allochirally identical in form. Each conveyor section includes a plurality of longer parallel idler rolls 130 and somewhat shorter rolls 131 and 132 forming a central opening 133 between the conveyor sections for the passage of the tire inflating rim assembly carried at the outer ends of the yokes 33 and 34. The rollers are supported on transverse plates 134 and 135 extending in the direction of travel of the tire, which at their ends are connected to plates 136 and 137 each provided with a pair of flanged wheels shown at 138 riding on and guided by the outside edges of the longitudinal frames 27 and 28. The conveyor sections 128 and 129 are thus supported for movement toward and away from each other to accommodate tires of different size.

As seen in FIG. 1, the plates 140 and 141 supporting the rollers of the conveyor section 129 are provided with slots in the gap provided between the two shortest rollers, the configuration of which is seen more clearly at 142 in FIG. 1. This accommodates the longitudinal frame 85 of the respective yoke and it can be seen that the inverted shallow V-shape of the fairly thin yoke longitudinal frame (see FIG. 3) minimizes the depth required for the slots 142 thus enabling the space beneath the post cure inflator as seen at 144 in FIG. 10 to be utilized more economically for press valving or similar functions. The special configuration of the yokes also provides a more compact rotating carriage and the use of longer fixed guides than could otherwise be provided with closer clearance between the rotating and fixed guides.

Proportional adjustment of the conveyor sections as well as the tire guides and stops is obtained by crank handles 146 and 147 at the discharge end of the machine. Each crank handle is secured to the end of a threaded rod 148 which is journalled in bracket 149 secured to the frame member 28. Such bracket also supports guide rods 150 and 151 extending therefrom. The threaded rod 148 is engaged in a tapped aperture extending through housing 152 which is supported for movement on the guide rods 150 and 151. The housing 152 supports retractible tire stop 127 including its actuating piston-cylinder assembly 153 seen in FIG. 1 as well as feeler finger 154 and its associated limit switch 155.

The housing 152 includes a projection 157 extending downwardly and at an angle thereto which is connected at 158 to link 159. As indicated in FIG. 3, the link includes an offset portion which, of course, provides clearance for the end of the yoke longitudinal frame. The opposite end of the link is pivotally connected at 160 to levers 161 and 162 which are pivoted at 163 and 164, respectively, such pivots being at the lower end of pivot pin retaining sleeves 166 and 167 held by brackets 168 and 169, respectively, secured to the frame 27. Each of the levers 161 and 162 includes a relatively short offset arm seen at 171 and 172, the distal ends of which are adjustably connected to the conveyor sections 128 and 129, respectively. The ends of the levels 161 and 162 opposite the pivot 160 support tubular columns 173 and 174 which support at their tops arms 175 and 176 supporting the side guide rollers 125 and 126, respectively. Support links 177 and 178 extend from the columns to the tops of the pivot pin sleeves 166 and 167 and are connected to such pivots in order to support firmly the columns and thus the side guide rollers in an upright position.

It can now be seen that the crank handle 146 will move the housing 152 along the guides 150 and 151 positioning the tire stop 127 and, of course, the finger 154 while simultaneously moving the levers 161 and 162 through the link 159 to pivot both the side guide rollers 125 and 126 simultaneously and also to move the conveyor sections 128 and 129 toward and away from each other. Since the roller 125 is about three times the distance from the pivot 163 as the end of the offset arm 171, the ratio of adjustment for the side guide rollers as compared to the conveyor carriage will be about on the order of three to one. In any event, the illustrated machine can very quickly and easily be adjusted to obtain a cured tire O.D. range from about 20 to about 32 inches.

The tire chuck lock mechanisms

Referring now more particularly to FIGS. 6 through 9, there is illustrated the tire chucking and inflating sequence for the bead inflating rim assemblies 61 and 101 which are seen at the lower right in FIG. 2.

Figure 6:
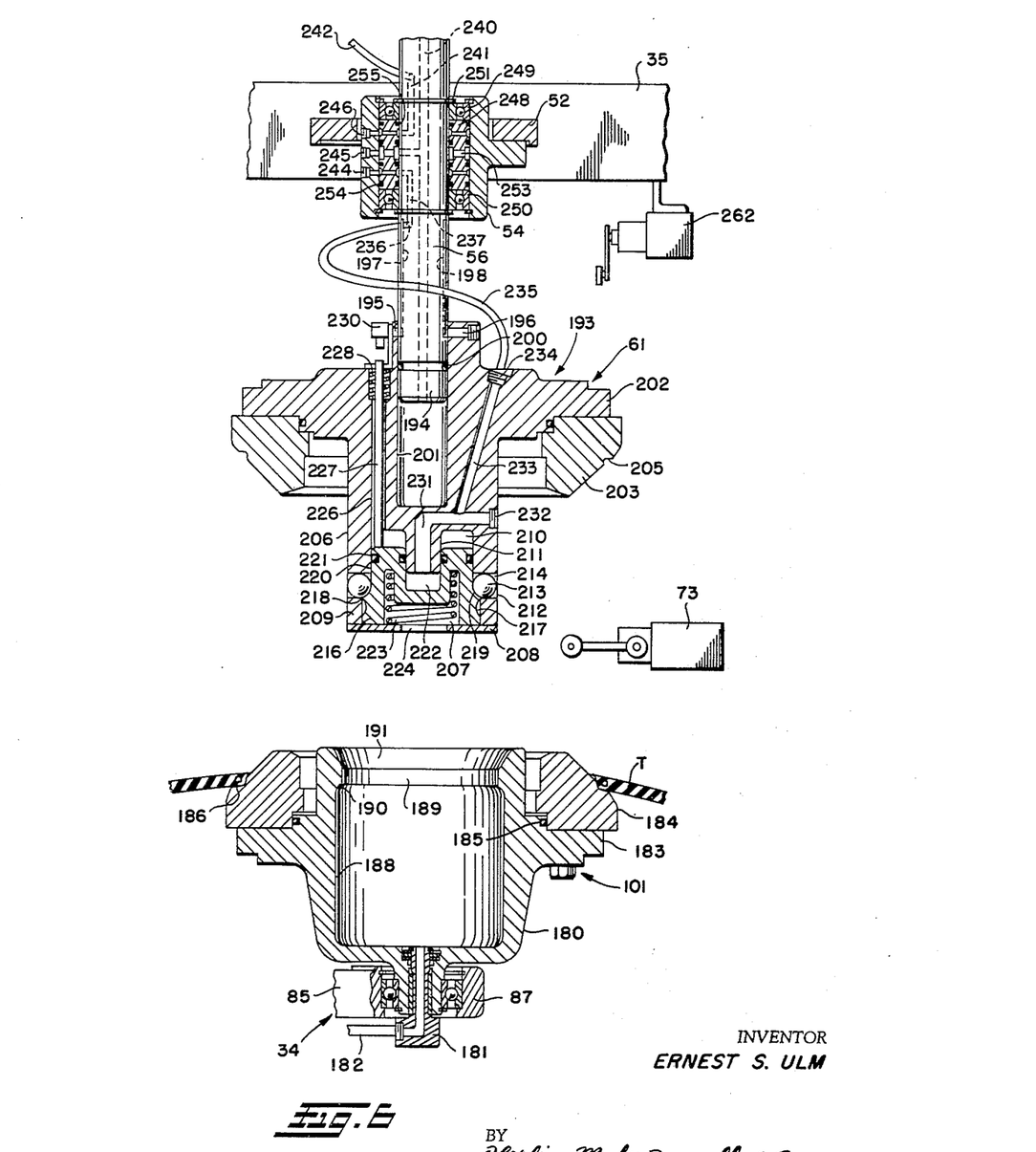

Referring first to FIG. 6, it will be seen that the assembly 101 comprises a cup-shape element 180 which, like the corresponding portion of the assembly 99, is journalled on the hub of the projecting arm 85 of the yoke 34, and pintle 181 extends through such journal to provide a connection for tire inflating line 182. The element 180 is provided with a peripheral flange 183 on which is secured by suitable fasteners tire bead engaging rim 184. A seal 185 is provided between the rim 184 and the element 180. The rim 184 may be constructed of aluminum and reference may be had to Brundage U.S. Patent No. 3,241,180 entitled Tire Rim Assembly for Use with Post Inflators for an illustration of the type of rim assembly that may be employed. Such rim assemblies are provided with alternating projections which may be pointed and recesses which intermesh with the corresponding recesses and projections of the opposed rim so that the bead seat shoulder 186 of the rims may be brought together so that the beads may actually be squeezed by the rim assemblies to effect an air seal between the bead and the rim thus to ensure proper inflation.

The interior of the element 180 is provided with a right circular cylindrical recess 188 having a restricted opening formed by inwardly directed ridge 189, the underside of which is rounded as indicated at 190 while the upper side is flared into a pilot surface 191.

The assembly 61 includes an element 193 which is mounted on the projecting end 194 of the axle 56 extending from the hub 54 secured to the center frame bridge plate 52. The element 193 is secured to the shaft for rotation therewith by key pins 195 and 196 projecting into slots 197 and 198, respectively, in the axle. The projecting end of the axle or shaft is provided with a seal 200 which provides an air seal between the periphery of the projecting end of the axle and deep cylindrical recess 201 in the back of the element 193. The recess forms a cylinder and the projecting end of the axle forms a rod to obtain a piston-cylinder assembly. The element 193, while secured to the axle for rotation therewith, is nonetheless mounted for axial sliding movement along the axle to the extent permitted by the length of the slots 197 and 198.

The element 193 includes a peripheral flange 202 to which is secured the bead engaging rim 203 which opposes the rim 184 and which is provided with a bead seat 205 axially aligned with the bead seat 186. The element 193 includes a cylindrical projection 206 designed closely to fit within the opening provided by the ridge 189 in the element 180. The projection includes a recess 207 in its end face which is closed by plate 208 secured to the annular end wall 209. The recess includes an annular upper projection 210 having an outside diameter somewhat less than the outside diameter of the main portion of the recess, the center of which is formed by projection 211 extending into the recess. The recess 207 also includes a plurality of radially extending ball ports 212 in which balls 213 are mounted for limited radial movement. The outer edge of the ports indicated at 214 may be provided with a small lip to prevent the balls from falling radially out of such ports.

The balls may be placed into such ports from inside the recess, but are held in such ports by ball lock piston 216. The piston 216 includes a lower major diameter portion fitted within the major portion of recess 207 which is provided with a slight peripheral ball receiving groove indicated at 217 forming at its top a cam lip 218 which, in the lowermost position of the piston 216, is adjacent the lower edge of the various ball ports 212. Above the lip 218, there is provided a circular shoulder shown at 219 which has a root diameter substantially less than the outside diameter of the bottom of the groove 217. From the shoulder 219, the piston extends in annular projection 220 into the annular recess 210 and is sealed both against the outside wall of the recess and the projection 211 forming the interior wall thereof as indicated at 221. The piston thus forms a central recess 222 in which the projection 211 is slidably mounted and which is somewhat deeper than such projection. The underside of the piston forms an annular recess receiving the upper end of compression spring 223 which extends from the plate 208 to the piston 216. The plate 208 is provided with a substantial center aperture as indicated at 224.

The upper end of the recess 210 is vented to atmosphere through passage 226 which also houses stop rod 227 biased by spring 228 against the upper end of the piston 216. A limit switch 230 is positioned above the rod 227 as indicated in FIG. 6 and will sense through the rod the position of the piston 216. An air passage 231 extends axially of the projection 211 providing fluid communication to the recess 222 and such passage includes a lateral extension plugged as indicated at 232. A connecting passage 233 extends to union 234 to which flexible hose 235 is connected. The hose 235 extends in a helical configuration and is connected to union 236 which joins the hose to passage 237 in the axle 56. The arrangement of the hose 235 permits communication to be maintained between passage 237 in the axle and the passage 233 leading to the recess 222 during axial movement of the assembly 61 on the projecting end of the axle.

In addition to the passage 237 in the axle 56, there is provided a center longitudinal air passage 240 which extends to both ends of the axle communicating with the recess 201 in the element 193 and, of course, the same recess in the corresponding element of the assembly 60 mounted on the opposite end of the shaft. There is also provided a passage 241 connected to flexible hose 242 which provides fluid communication to the ball lock piston of the assembly 60 in the same manner as illustrated in FIG. 6 for the assembly 61. It is noted that the passage 241 may be slightly longer than the passage 237 to permit the mounting of the drive pulley 82 on the axle immediately adjacent the hub 54.

The passage 237 is connected to port 244 in the hub while the passage 240 is connected to port 245 and the passage 241 to port 246. A rotary air seal 248 is positioned concentrically about the axle 56 between sealed ball bearings 249 and 250 on each end thereof which are held in place by snap rings 251, both on the axle and the hub.

The rotary seal 248 is provided with three air passages communicating with the ports 244 through 246 and also the corresponding passages 237, 240 and 242, and each passage in the seal consists of coplanar grooves on both the O.D. and I.D. of the rotary seal 248 interconnected by one or more radially drilled passages indicated at 253. The passages in the rotary seal are axially separated by O-ring seals on the O.D. as indicated at 254 and U-cup rotary seals on the I.D. as shown at 255.

The male units of each tire chuck assembly, i.e. those mounted on the center frame 32, are accordingly each provided with two air passages through the rotating shaft or axle 56, one passage supplying line pressure for tire squeeze, not to be confused with tire inflation, and one for pressure to actuate the single acting ball lock piston 216. Although the ball lock pistons may be considered single acting, they do nonetheless receive pressure from both sides at least during inflation of the tire and this obtains a safety interlock preventing the tire chucking assemblies from separating while the tire is under inflation pressure. This safety interlock is, of course, important since if the tires are inflated at approximately 100 p.s.i., the force tending to separate the assemblies for a 32" tire would be in the neighborhood of 50,000 pounds.

Figure 7:
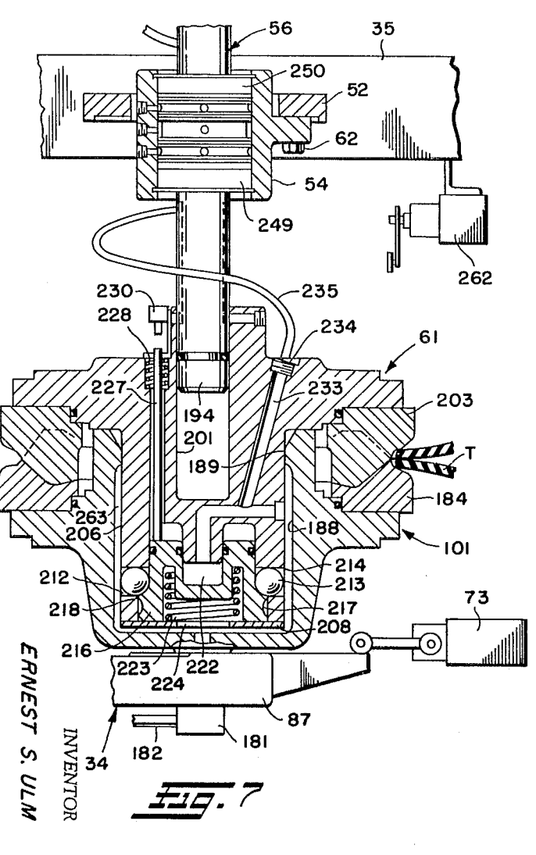

The operation of the ball lock mechanism may perhaps more clearly be seen in comparing FIGS. 6 through 9, showing the chucking cycle, and more particularly FIGS. 7 and 8 which show the actuation of the lock.

In FIG. 6, the lower assembly 101 has moved beneath the plane of the associated conveyor sections and to pick up the tire, the piston-cylinder assembly 96 is retracted to elevate the yoke 34. In such condition, the assembly 101 will not yet be rotating although the assembly is journalled to the yoke. The axle 56, however, will be rotating at the speed noted above. Line pressure will continually be applied through the center passage 240 to the recess 201 which causes the assembly 61 to extend on the projection 194 of the axle to the extent permitted by the key pins 195 and 196 in the slots 197 and 198. Pressure is also supplied through the rotary seal to the flexible hose 235 which through the passages 233 and 231 pressurizes chamber or recess 222 maintaining the ball lock piston 216 against the end plate 208 with the spring 223 compressed. In such position, the radiused shoulder 219 will permit the balls 213 to move radially inwardly to clear the peripheral surface of the projection 206.

As retraction of the cylinder assembly 96 lifts the yoke 34, the projection 206 will telescope within the recess 188 of the element 180 with the ridge 189 closely clearing the periphery of the projection 206. Continued closing of the chucks achieves for the assemblies 61 and 101 the position shown more clearly in FIG. 7 wherein the beads of a tire shown at T may be brought closely together by the interfitting rims 203 and 184. In such condition, the yoke 34 trips limit switch 73, the actual position of which is seen more clearly in FIG. 4. The making of limit switch 73 will now permit the venting of the chamber 222 holding the ball lock piston 216 down if the limit switches 230 and 262 are clear. The limit switches 73 and 262 ensure that the assemblies have telescoped together with the former indicating the maximum up position of the yoke 34 and the latter indicating the position of the assembly 61 with respect to the axle or shaft 56.

When the chamber 222 is vented as seen in FIG. 8, the spring 223 will force the piston upwardly causing the balls 213 to ride over the camming lip 218 and seat within the annular groove 217. This, of course, forces the balls radially outwardly in their respective ports 212 and the position of the groove 217 therebehind as indicated in FIG. 8 prevents the ball then from moving back radially inwardly. When the piston moves to its locking position, the balls project radially from the periphery of the projection 206 into the clearance 263 provided between the projection 206 and the recess 188 beneath the ridge 189.

When the spring 223 forces the ball lock position upwardly and, of course, the balls 213 outwardly, rod 227 moves against the pressure of spring 228 to trip limit switch 230. With the limit switch 230 made and the switch 262 still clear, the tire will now be inflated by supplying pressure through the line 182 and the pintle 181. As the pressure enters between the assemblies and into the tire, the assemblies will be forced apart or to the position seen in FIG. 9. The pressure in the much larger area of the tire overcomes the constant line pressure in recess 201 and the upper assembly 61 backs off to the point wherein the balls 213 engage the rounded underside 190 of the ridge 189 and prevent further separation of the assemblies. In such position, the limit switch 262 will be made signalling that inflation has taken place. Because of the extreme difference in the areas to which the pressure is applied, it will take only from about 2 to about 9 pounds per square inch within the tire to overcome the line pressure in the recess 201 at the end of the axle 56. The center frame in the yokes will now shift the tire to its cooling position. Actually the tire may be shifted as soon as the limit switch 230 is tripped ensuring that the balls 213 are in their locking position.

Figure 9:
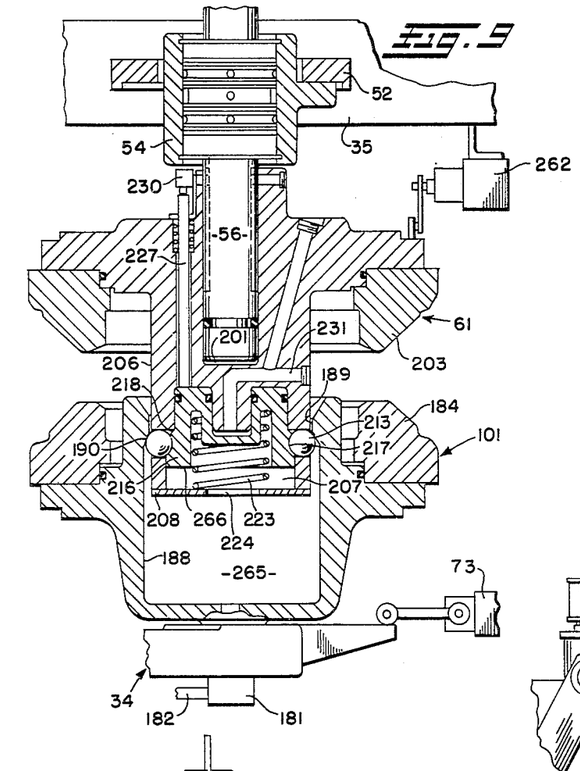

With inflation pressure of the tire on and, of course, with inflation pressure within the chamber 265 seen in FIG. 9 communicating with the end 266 of the ball lock actuating piston 216 through the opening 224 in the plate 208, the piston will be held in its locking position even if pressure is applied to the top thereof through line 231. This is, of course, due to the much larger area at the bottom of the piston 216 exposed to the inflation pressure as opposed to the much smaller area exposed to the actuating pressure from line 231. Accordingly, both the force of spring 223 as well as inflation pressure will act on the piston maintaining it in its locking position. Also, there is a mechanical lock provided since the piston 216 cannot move downwardly until the balls 213 have moved downwardly off of the radiused undersurface 190 of the ridge 189 since they otherwise cannot move over the camming lip 218 immediately above the locking groove 217. Such movement of the balls from the ridge 189 is, of course, only obtainable at about the aforementioned 2 to 9 p.s.i. of inflation pressure wherein the line pressure in the chamber 201 at the end of the axle 56 would move the unit 61 downwardly. In the illustrated embodiment, the diameter of the area of the piston 216 exposed to inflation pressure may be in excess of three times that exposed to actuating pressure through the line 231. The spring loaded differential area piston 216 thus ensures locking safety at the high inflation pressures.

The reverse operation moving from FIGS. 9 to 6 is employed for unlocking the chucks and depositing the post cure inflated tire on the conveyor sections for discharge from the machine. When the inflation pressure has been vented to the aforementioned low range, the pressure in the chamber 201 will cause the upper assembly 61 to move downwardly with respect to the low assembly 101 clearing the balls 213 from the ridge 189 so they are at least mechanically free to roll over the camming lip 218 and this then clears limit switch 262. Line 231 is now pressurized to force the piston 216 downwardly against the pressure of spring 223 and any low residual inflation pressure to cam the balls over the camming lip 218 and holding the ball locking piston in the position shown in FIG. 7. The limit switch 230 is now cleared and with both switches 230 and 262 now clear, the yoke piston-cylinder assembly 96 will be caused to extend moving the bottom assemblies 101 downwardly to the position shown in FIG. 6 depositing the post cure inflated tire on the conveyor sections. The tire stop 127 wil be retracted by piston-cylinder assembly 153 and the cooled tire will roll from the unit. The tire stop 127 will then be repositioned and a new tire coming from the press will then be inflated in the same manner.

Operation

Referring now additionally to FIGS. 10 through 14, the piston-cylinder assembly 96 of the unit 1 will be extended positioning the yoke 34 below the conveyor sections with the rim assemblies 99 and 101 fitting within the recesses 133 in such assemblies. The cross arm 85 of the yoke, of course, fits within the slots 142 in the inner conveyor sections 129. As the tire A exits from the press, it will slide down the discharge conveyor 10 onto the conveyor sections of the unit 1 to be properly positioned by the stop 127 and the side guide rollers 125 and 126. When the tire engages the stop 127, it will also strike feeler arm 154 tripping limit switch 155 which actuates the piston-cylinder assembly 96. Since the unit 1 receives two tires at a time, both limit switches 155 on each side of the machine must be tripped before the piston-cylinder assembly 96 will retract. The retraction of the assembly 96 or the elevation of the yoke 34 to the position shown in greater detail in FIG. 7 trips limit switch 73 and with switches 230 and 262 clear as seen in FIG. 7, the ball lock piston 216 is vented which in turn trips switch 230 which in turn permits the application of inflation air and this in turn trips inflation limit switch 262. Switch 262 starts an inflation timer and the machine is now clear to index to its cooling position.

Figure 11:
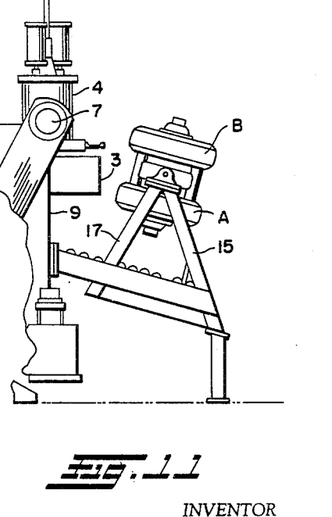

The position of the tire A achieved in FIG. 11 is still in the loading position of the post cure inflator with the assembly 96 retracted but prior to indexing to the cooling position. In such position, as shown in FIG. 11, the ball lock mechanism is actuated as seen in FIGS. 7 and 8 and inflation pressure is applied. The drive 47 is now energized to rotate the center frame and the yokes locked thereto by the rim locking mechanisms shown through an arc of 75° in a clockwise direction as viewed in FIGS. 10 through 14 to position the tires in the position of FIG. 12. The term tires is employed since the preceding tire B from the press 2 has been chucked up on the assemblies 60 and 100 and is being held and rotated in its inflated condition as the tire A is loaded and inflated. In the cooling position of FIG. 12, the tires are held in a vertical plane and rotation continues with the inflated tire driving the outer journalled assemblies 101, etc. from the driven inner assemblies 61, etc.

We will now shift cycles to the tire B which has been cooling while the tire A was curing in the press. At the end of the cooling cycle for the tire B, as indicated by a timer, deflation begins and the drive 47 is again energized to rotate the center frame and yokes locked thereto through an arc of 105° in the same clockwise direction to the unloading position seen in FIG. 13. This now positions the tire A on top and the tire B on the bottom or unloading position.

Figure 13:
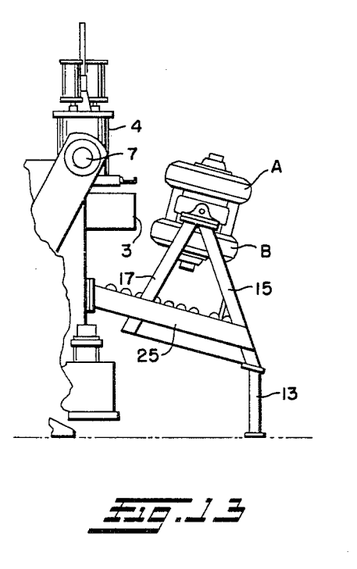
Figure 14:
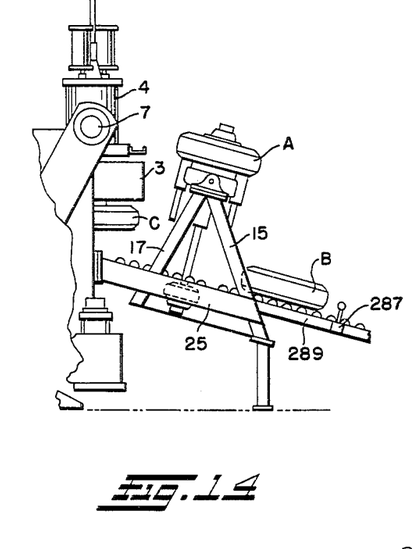

When the inflator achieves the unloading position seen in FIG. 13, which may correspond to that in greater detail seen in FIG. 1, limit switch 280 will be tripped which is mounted on stop frame 281 supported by braces 282 and 283 at the top of the struts 15 and 17. An adjustable stop button 284 projecting laterally from the center frame also engages such stop frame to ensure positive positioning for unloading. Even though the switch 280 is tripped indicating a proper unloading position, the piston-cylinder assembly 96 will not extend until the limit switches 230 are triggered as the result of application of pressure to the chamber 222 above the ball lock actuating piston, which in turn is the result of the clearing of switch 262 indicating that low inflation pressure has been achieved. When the piston-cylinder assembly 96 is extended, it will, of course, react against the yoke 34 which is now on top, which is locked to the center frame through the ball lock mechanisms between the assemblies 59 and 99, and 61 and 101. The yoke now moves down being guided initially by the guide pins on the center frame and then by the fixed guides 116 and 117 and when it has achieved its lowermost position it will trip bottom limit switch 286 seen in FIG. 4. When the limit switch 286 is cleared, that is when the piston-cylinder assembly 96 is retracted to pick up a tire by the bead ring, the piston-cylinder assembly 153 seen in FIG. 1 will be energized to retract the stop 127. The making of the switch 286 will, however, not reposition the stop since this will be accomplished by tire exit limit switch 287 operated by a dancer roll seen in FIG. 14. The switches 286 and 287 when both made indicate that the post cure inflator is clear to receive the next tire from the press and such switches may be interlocked with the press itself to ensure as short a time as possible between the clearing of the inflator unit and the depositing of a new cured tire therein. When the tire B is deposited on the conveyor sections, it will simply roll down conveyor extension 289 which supports the dancer roll and exit limit switch 287 and onto a further conveyor which may extend normal to the plane of FIG. 14.

When the next pair of tires are loaded, the piston-cylinder assembly 96 will retract locking and inflating the tires on the unit. This time, when the drive 47 is signalled, it will rotate the unit in a counterclockwise direction as viewed in FIGS. 10 through 14 to the cooling position seen in FIG. 12. The tire A will be in the same position as before, but a further tire C now will have replaced tire B.

As seen in FIG. 1, a limit switch 290 mounted on plate 291 bridging the struts 15 and 16 indicates to the drive unit 47 the achievement of the cooling position. Now, moving back to the cycle of tire A, when its inflation timer times out, the drive unit 47 will again be energized to move the unit in a counterclockwise direction back to the position shown in FIG. 11. In such unloading position for the tire A, adjustable stop button 293 seen in FIG. 1 will engage the stop plate 281 and limit switch 294 will be tripped signalling the achievement of the unloading position for the tire A. This switch performs the same function as switch 280 which is merely to indicate that the inflator is in the position to unload, but again the unloading cycle cannot commence until deflation and unlocking takes place. The tire A is then redeposited on a conveyor to clear the unit and a new tire will take its place.

Figure 12:
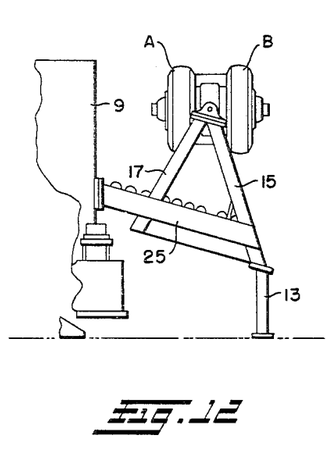

In the illustrated embodiment, it can now be seen that the drive unit 47 has moved the inflator incrementally first in a clockwise direction as viewed in FIGS. 10 through 14 through an arc of 75° to obtain the cooling position of FIG. 12, and then through an arc of 105° to obtain the unloading position for the other tire. When the next tire is loaded and locked in place, the drive unit 47 will then rotate the unit 105° in a counterclockwise direction as viewed in FIGS. 10 through 14 back to the cooling position of FIG. 12. Then, to unload the original tire, the drive unit 47 again rotates the unit 75° in such counterclockwise direction to the unloading position.

Because of the ability to position the tires in a vertical plane as indicated in FIG. 12, a uniform release temperature is obtained. Moreover, it is apparent that because of the compact nature of the oscillating unit with the area between and around the tires being substantially open, a hood or enclosure can be provided for forced air cooling. Additionally, it is apparent that there is provided a unique chuck locking mechanism which will obtain automatic and secure locking of the elements at any relative rotational position thereof and which has both pressure and mechanical safety interlocks preventing release of the tire while under pressure.

Other advantageous features are provided, such as the use of both fixed and rotatable guides, which with the yoke configuration, reduce the space requirements of the unit. Moreover, the post cure inflator will accommodate a wide variety of tire sizes with only minor adjustments.

Other modes of applying the principles of the invention may be employed, change being made us regards the details described, provided the features stated in any of the following claims or the equivalent of such be employed.

I, therefore, particularly point out and distinctly claim as my invention:

1. A post cure inflator comprising a pair of chuck element means for releasably holding two tires for movement between a loading station and a cooling station, support means for said chuck element means, means mounting said support means for rotation about a horizontal axis, said chuck element means for each tire being on opposite sides of such horizontal axis, each of said chuck element means having an axis, and indexing means for rotating said support means to index first one and then the other of said chuck element means from a cooling station in which the axes of both of said chuck element means are horizontal for maintaining the tires held thereby in a vertical plane during cooling directly to said loading station which is circumferentially displaced from said cooling station for removal and replacement of the tire from said chuck element means and to directly return said chuck element means to said cooling station.

2. A post cure inflator as set forth in claim 1 wherein said support means is rotated in one direction to index one of said chuck element means from the loading station to the cooling station and then rotated in the same direction to index the other chuck element means from the cooling station to the loading station, after which the support means is rotated in the reverse direction to index said other chuck element means from the loading station back to the cooling station, and then rotated in the same reverse direction to index said one chuck element means from the cooling station to the loading station.

3. A post cure inflator as set forth in claim 2 wherein the axes of said chuck element means are disposed at a slight angle to vertical when either of said chuck element means is in the loading station, whereby the degree of rotation of the support means required in one direction to index one of said chuck element means from the cooling station to the loading station is greater than the degree of rotation of the support means required in the opposite direction to index the other chuck element means from the cooling station to the loading station.

4. A post cure inflator as set forth in claim 3 wherein one of such chuck element means is on the order of 105° from the loading station when rotated in one direction and the other chuck element means is on the order of 75° from the loading station when rotated in the opposite direction when both of said chuck element means are at the cooling station.

5. A post cure inflator as set forth in claim 1 further comprising drive means operative to rotate both of said chuck element means about their respective axes when at the cooling station.

6. A post cure inflator as set forth in claim 1 wherein said indexing means comprises a reversible motor drive unit, and means responsive to the attainment of the cooling and loading stations by said chuck element means to stop said drive means.

7. A post cure inflator as set forth in claim 1 further comprising means for controlling the amount of time said chuck element means remain at the cooling station before indexing said chuck element means to the loading station for removal and replacement of the tire and to return to the cooling station.

8. A post cure inflator as set forth in claim 1 wherein each of said chuck element means includes locking means for affixing a tire to each chuck element means, and means responsive to the locking condition of said locking means when said chuck element means is at the loading station to index said chuck element means to the cooling station.

9. A post cure inflator as set forth in claim 1 wherein there are two of said chuck element means on said opposite sides of the axis of said support means, each chuck element means comprising two inflating rim assemblies, one of said inflating rim assemblies being fixed to said support means; and wherein there is a yoke on opposite sides of the axis of said support means and each yoke is movable with respect to said support means, each said yoke including a shallow V-shaped frame member opening away from said support means and having the other of said inflating rim assemblies of each chuck element means on the ends of each said yoke opposed to said one inflating rim assembly on said support means, a pair of guide sleeves mounted on said yokes at the center thereof and on said V-shaped frame, and guide rods mounted on said support means, one axially aligned with each sleeve, guiding said yokes for movement with respect to said support means.

10. A post cure inflator as set forth in claim 9 wherein each of said yokes includes a second V-shaped transverse frame member each opening toward said support means, said guide sleeves being supported on the ends of said second V-shaped transverse frame member.

11. A post cure inflator as set forth in claim 9 further comprising a tire receiving conveyor section for loading and unloading tires, and fixed guides projecting from said conveyor section, and aligned with the guide rods on said support means when the respective yokes are positioned for loading and unloading tires.

12. A post cure inflator as set forth in claim 11 including a piston-cylinder assembly interconnecting said yokes at the center thereof operative to effect said movement of said yokes and the sleeves thereof along said guide rods on said support means and said fixed guides.

13. A post cure inflator as set forth in claim 9 including hubs on said support means, axles journaled in said hubs and driven for rotation, the tire inflating rim assemblies on said support means being axially slidably mounted on the ends of said axles and keyed thereto for rotation therewith.

14. A post cure inflator as set forth in claim 13 wherein the inflating rim assemblies mounted on said yokes are journaled thereon for rotation.

15. A post cure inflator as set forth in claim 14 including means operative to supply air under pressure to said axles operative to urge the rim inflating assemblies mounted thereon away from said support means, said rim inflating assemblies on said support means having axial projections with chuck locking elements thereon, and piston-cylinder assemblies within said projections operative to move said elements radially, and means operative to supply air under pressure through said axles to said piston-cylinder assemblies for operation of said locking elements.

References Cited

UNITED STATES PATENTS

| | | |
|---|---|---|
| 2,978,741 | 4/1961 | Soderquist. |
| 3,075,237 | 1/1963 | Soderquist. |
| 3,164,268 | 1/1965 | Ericson. |
| 3,170,187 | 2/1965 | Brundage. |
| 3,214,791 | 11/1965 | Ericson et al. |

J. HOWARD FLINT, JR., Primary Examiner

U.S. Cl. X.R.

214—1

UNITED STATES PATENT OFFICE
CERTIFICATE OF CORRECTION

Patent No. 3,483,596      Dated December 16, 1969

Inventor(s) Ernest S. Ulm

It is certified that error appears in the above-identified patent and that said Letters Patent are hereby corrected as shown below:

The assignee AMK Subsidiary Corp. should be changed to -- NRM Corporation.

In the specification, Column 2, line 64, "tires" should be -- tire --. Column 6, line 5, "levels" should be -- levers --. Column 11, line 75, "us" should be -- as --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents